United States Patent
Roese et al.

(10) Patent No.: US 10,382,279 B2
(45) Date of Patent: Aug. 13, 2019

(54) DYNAMICALLY COMPOSED COMPUTE NODES COMPRISING DISAGGREGATED COMPONENTS

(71) Applicant: EMC Corporation, Hopkinton, MA (US)

(72) Inventors: John Roese, Newmarket, NH (US); Kenneth Durazzo, San Ramon, CA (US); Stephen Todd, Shrewsbury, MA (US)

(*) Notice: Subject to any disclaimer, the term of this patent is extended or adjusted under 35 U.S.C. 154(b) by 97 days.

(21) Appl. No.: 14/320,069

(22) Filed: Jun. 30, 2014

(65) Prior Publication Data

US 2015/0381426 A1    Dec. 31, 2015

(51) Int. Cl.
  *G06F 15/16* (2006.01)
  *H04L 12/24* (2006.01)
  *G06F 9/50* (2006.01)

(52) U.S. Cl.
  CPC ........ *H04L 41/0896* (2013.01); *G06F 9/5077* (2013.01)

(58) Field of Classification Search
  CPC ........... G06F 2009/4557; G06F 9/5077; G06F 9/45558; G06F 9/5072
  USPC ........................................................ 709/226
  See application file for complete search history.

(56) References Cited

U.S. PATENT DOCUMENTS

| | | | |
|---|---|---|---|
| 7,512,944 B2 | 3/2009 | Schneider | |
| 7,590,623 B2 | 9/2009 | Fellenstein | |
| 7,661,089 B2 | 2/2010 | Cope | |
| 7,810,090 B2 | 10/2010 | Gebhart | |
| 8,051,158 B2 | 11/2011 | Kojima | |
| 8,700,611 B2* | 4/2014 | Kelshikar | G06F 17/30545 707/722 |
| 9,218,276 B2 | 12/2015 | Oe | |
| 2002/0095671 A1 | 7/2002 | Delo | |
| 2003/0033448 A1 | 2/2003 | Kieffer | |
| 2005/0097145 A1* | 5/2005 | Benhase | H04L 67/1095 |
| 2005/0138618 A1 | 6/2005 | Gebhart | |
| 2006/0015865 A1 | 1/2006 | Schneider | |
| 2006/0149714 A1 | 7/2006 | Fellenstein | |
| 2006/0294515 A1* | 12/2006 | Gimpl | G06F 9/4416 717/174 |
| 2008/0244057 A1 | 10/2008 | Kojima | |
| 2008/0320483 A1 | 12/2008 | Hou | |
| 2009/0313229 A1 | 12/2009 | Fellenstein | |
| 2010/0135241 A1* | 6/2010 | Wang | H04W 16/14 370/329 |
| 2010/0312893 A1* | 12/2010 | Watanabe | G06F 9/5077 709/226 |
| 2010/0332262 A1* | 12/2010 | Horvitz | G06F 9/5027 705/4 |
| 2012/0144219 A1 | 6/2012 | Salahshour | |

(Continued)

OTHER PUBLICATIONS

Rencuzogullari et al., Dynamic Adaptation to Available Resources for Parallel Computing in an Automous Network of Workstations, published by ACM, 2001, pp. 72-81.

*Primary Examiner* — Hieu T Hoang
(74) *Attorney, Agent, or Firm* — Krishnendu Gupta; Peter Jovanovic

(57) ABSTRACT

A method, article of manufacture, and apparatus for creating dynamically composed compute nodes from disaggregated hardware components is discussed. These components may be dynamically allocated from resource pools to the compute nodes.

12 Claims, 10 Drawing Sheets

(56) References Cited

U.S. PATENT DOCUMENTS

| | | | |
|---|---|---|---|
| 2013/0042003 A1* | 2/2013 | Franco | H04L 67/1097 709/226 |
| 2013/0212650 A1* | 8/2013 | Dabbiere | H04L 63/105 726/4 |
| 2013/0219144 A1 | 8/2013 | Oe | |
| 2013/0339298 A1 | 12/2013 | Muller et al. | |
| 2014/0007097 A1* | 1/2014 | Chin | G06F 9/45533 718/1 |
| 2014/0036924 A1* | 2/2014 | Christenson | H04L 12/4641 370/395.53 |
| 2014/0047201 A1* | 2/2014 | Mehta | G06F 13/00 711/158 |
| 2014/0089579 A1* | 3/2014 | Kurokawa | G06F 3/0674 711/112 |
| 2014/0188825 A1 | 7/2014 | Mutthukkaruppan et al. | |
| 2014/0359044 A1* | 12/2014 | Davis | H04L 45/60 709/213 |
| 2015/0128139 A1 | 5/2015 | Suzuki | |
| 2015/0263890 A1* | 9/2015 | Fall | G06F 9/45558 709/226 |
| 2015/0295800 A1* | 10/2015 | Bala | H04L 67/2819 709/224 |
| 2015/0371031 A1 | 12/2015 | Ueno | |

* cited by examiner

DYNAMICALLY COMPOSED COMPUTE NODES COMPRISING DISAGGREGATED COMPONENTS

CROSS REFERENCE TO RELATED APPLICATIONS

This Application is related to U.S. patent application Ser. No. 14/320,001, now U.S. Pat. No. 9,852,138 entitled "CONTENT FABRIC FOR A DISTRIBUTED FILESYSTEM" Ser. No. 14/319,889 entitled "SOFTWARE OVERLAYS FOR DISAGGREGATED COMPONENTS" Ser. No. 14/318,805, now U.S. Pat. No. 10,341,458 entitled "APPLICATION AND INFORMATION MOVEMENT IN A CLOUD ENVIRONMENT" Ser. No. 14/318,831 now U.S. Pat. No. 10,185,596 entitled "CLOUDBOOK", and Ser. No. 14/319,773, now U.S. Pat. No. 9,871,851 entitled "MIGRATING PRIVATE INFRASTRUCTURE SERVICES TO A CLOUD", filed on even date herewith, which are hereby incorporated herein by reference in their entirety.

FIELD OF THE INVENTION

This invention relates generally to computer platforms, and more particularly to systems and methods for creating dynamically composed computed nodes from disaggregated hardware components.

BACKGROUND OF THE INVENTION

Information technology infrastructures have evolved. Early infrastructures comprised thin-clients in communication with a mainframe. The mainframe included hardware resources that were shared by all the clients in the infrastructure. These infrastructures may be referred to as "first platform."

Mainframes eventually lost popularity to general-purpose personal computers and/or servers. These computers include hardware components bundled together into a single sheet metal box, and are commonly used as building blocks for more complex systems. These infrastructures may be referred to as "second platform."

Currently there is a trend away from mainframes, personal computers, and servers to a new, third platform infrastructure. Third platform infrastructures may be summarized by at least five trends: mobility, social, big data, cloud, and trust.

There is a need, therefore, for an improved method, article of manufacture, and apparatus for allocating hardware resources to third platform infrastructures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The methods, processes, and systems described herein enable disaggregated hardware resources and/or components to be combined into a dynamically composed compute node (also referred to herein as a "DCCN" or "compute node"). Traditional infrastructures comprise hardware components that are preassembled inside of an enclosure. These infrastructures are commonly scaled out on an enclosure basis, and are often divided between storage servers and compute/memory servers. Traditional infrastructures do not, however, scale well in a cloud environment. They are bounded by the number of servers in the environment and the server capacity. To increase an environment's resources, new components or enclosures must be physically added, consuming time and adding cost. The methods, systems, and processes discussed herein alleviate these concerns by providing a mechanism for combining disaggregated hardware components into a DCCN.

Figure 1:
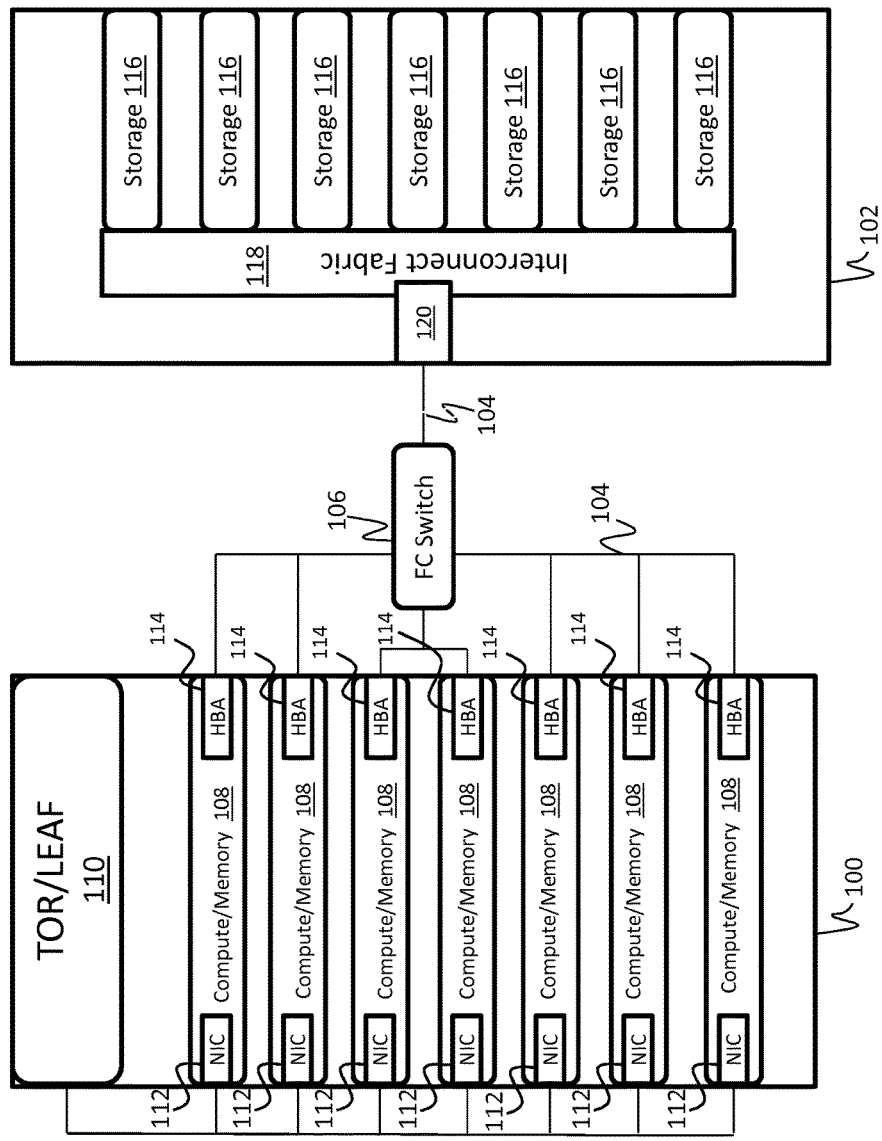
FIG. 1 depicts a traditional infrastructure consistent with an embodiment of the present disclosure.

FIG. 1 depicts a traditional infrastructure consistent with an embodiment of the present disclosure. Unlike the systems discussed in reference to FIG. 2 et seq., the system shown in FIG. 1 may be purpose built for a given entity or application. The system may comprise server 100 and storage server 102 in communication with each other over network 104. In an embodiment, network 104 may comprise fiber channel connected through fiber channel switch 106.

Server 100 may comprise compute and/or memory resources 108 in communication with top-of-rack ("TOR") switch 110 via Network Interface Controllers ("NIC") 112. Compute/memory resources 108 may interface with network 104 through Host Bus Adaptors ("HBA") 114. In an embodiment, computer server 100 primarily comprises processing resources, such as computer memory or processors, and contains limited storage resources.

Storage server 102 may comprise storage resources 116 connected by interconnect fabric 118. In an embodiment, storage server 102 may be part of a storage area network ("SAN"). Storage resources 116 could be, for example, tape or spinning-disk resources. Storage server 102 may further comprise storage processor 120 in communication with interconnect 118. HBA 120 may interface with network 104, allowing data to be received from or transmitted to server 100.

The traditional infrastructure of FIG. 1 presents numerous challenges. First, the constituent hardware components are typically bundled together by type inside of an enclosure, such as a server rack. For example, server 100 may comprise compute/memory resources 108 and TOR switch 110 bundled inside of a single machine. Similarly, storage server 102 may comprise storage resources 116 bundled together inside of a machine. Adding additional resources may therefore require physically adding new enclosures or components, resulting in system downtime and/or expense.

Second, traffic flow in traditional infrastructures may be characterized as north-south ("N-S"), meaning I/O primarily flows from server 100 southwards through network 104 to storage server 102. Server 100 may be bound to storage server 102 in this N-S fashion, creating a siloed environment. As a result, a fully utilized server group cannot spill-over and consume resources from a separate, underutilized siloed environment. Similarly, data services such as snap copy, disaster recovery, and/or backup cannot be shared between the siloed environments. Instead, each siloed environment must comprise its own instance of these high-availability/resilience models.

The N-S dataflow also presents latency and communication issues. For example, communication within the infrastructure may require multiple hops and intercepts along the N-S data path. These hops may result from the different layers and protocols required for communication between the hardware components. For example, data may be processed by a compute/memory resource 108, transmitted over network 104 using HBA 114 and Fiber Channel Switch 106, received by storage processor 120 and communicated to storage 116 via interconnect 118. Each of these communications may use different protocols, thereby increasing overhead, management complexity, and troubleshooting complexity. The latency issues may be further exasperated for out of rack requests since the TOR connectivity maybe separate from the compute to storage connectivity.

Persistent data services, such as snap, deduplication, or replication, are also limited within the traditional infrastructure. These data services may be limited to storage server 102 and unavailable at server 100. Applications wishing to store persistent data at server 100 are therefore not privy to these services, potentially resulting in data loss or corruption. Alternatively, the data services may exist independently on both storage server 102 and server 100, but have disparate implementations.

Figure 2:
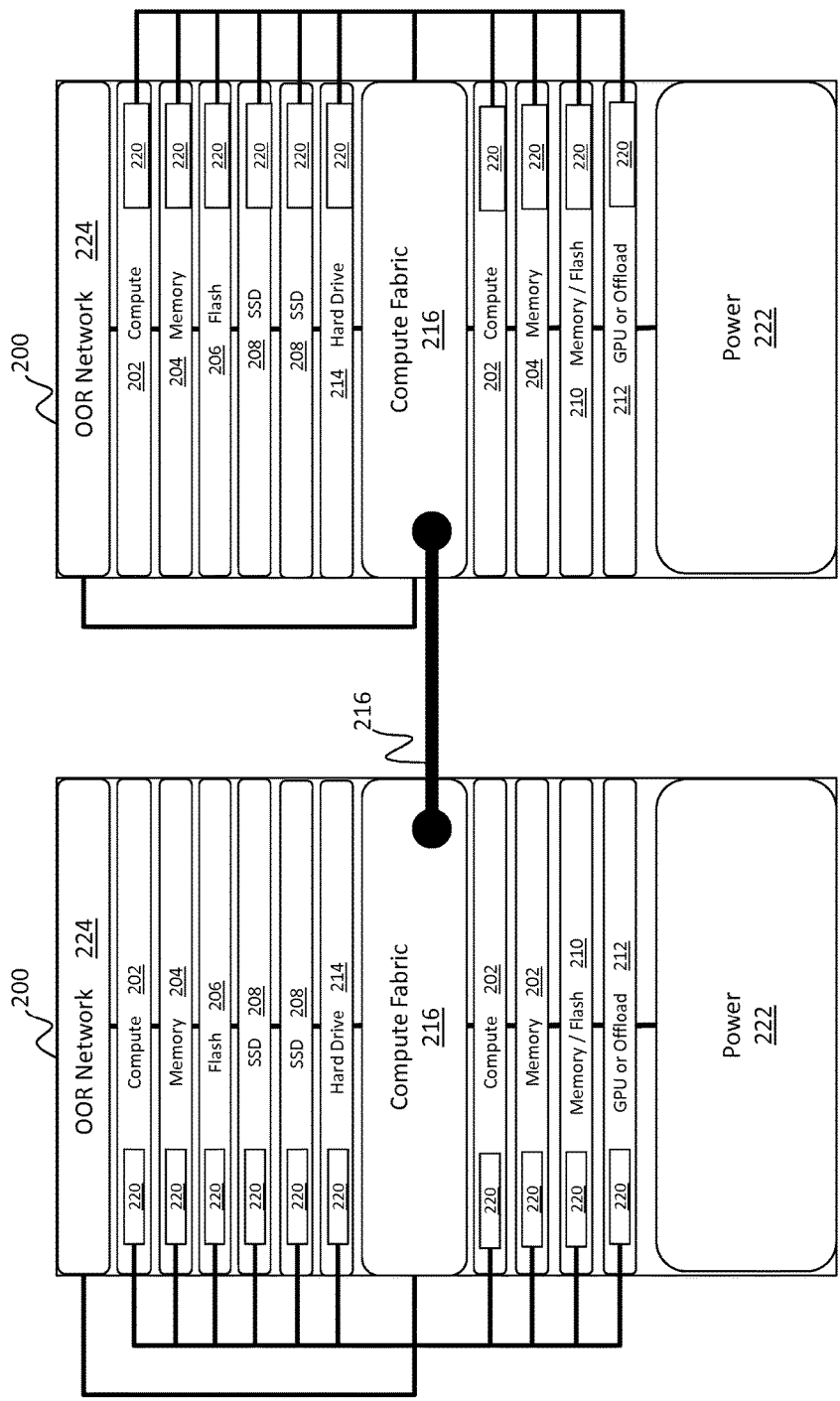
FIG. 2 depicts a disaggregated infrastructure consistent with an embodiment of the present disclosure.
Figure 3:
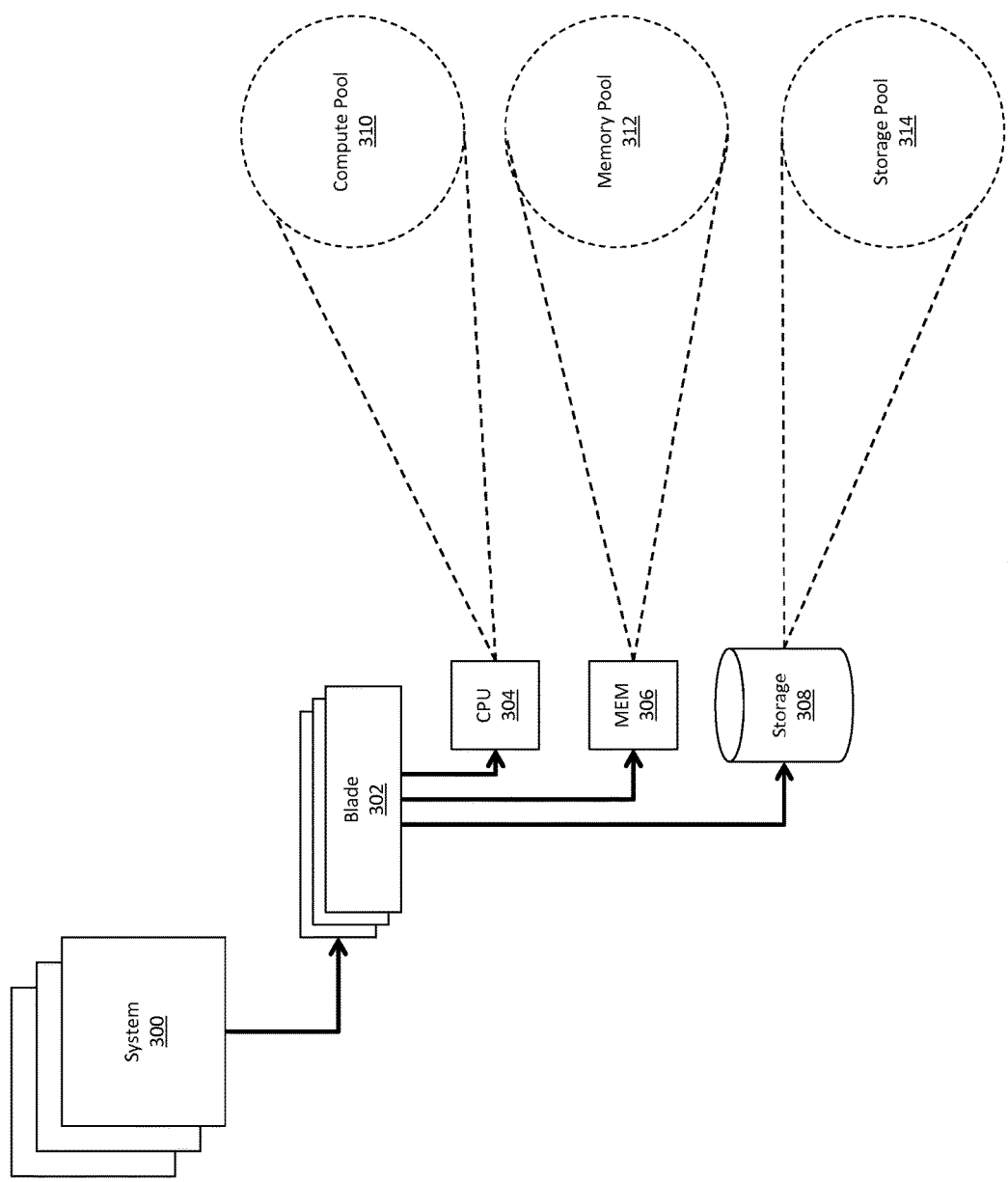
FIG. 3 depicts logical resource pools consistent with an embodiment of the present disclosure.

The disaggregated infrastructure depicted in FIG. 2 and FIG. 3 addresses the limitations of traditional infrastructures. In FIG. 2 and FIG. 3, hardware components may be disaggregated from their enclosures and combined together into logical pools of resources. Different components may be dedicated from these pools to specific applications and/or entities to form a dynamically composed compute node, and may be dynamically added or removed from this compute node as needed. This is unlike traditional infrastructures that are typically purpose built for specific applications. This may also be unlike traditional cloud-based services which pool and allocate virtual resources rather than physical resources.

For example, FIG. 2 depicts two separate racks 200 comprising various hardware components. These components include compute components (e.g. processors) 202, memory 204, flash 206, solid state drive ("SSD") 208, flash memory 210, graphics processing unit 212, and hard drive 214. These components may be in communication with each other via compute fabric 216, which may be accessed through physical ("phy") interfaces 220. In an embodiment, compute fabric 216 stretches across all the racks in the disaggregated infrastructure. This allows the hardware components to communicate directly with one another via the compute fabric, regardless of whether they are on the same rack. This compute fabric enables East-West ("E-W"), or server-to-server, communication. Racks 200 also include power supplies 222 and out of rack ("OOR") network interface 224.

The components shown in FIG. 2 are provided as a non-limiting example. For example, racks 200 may include additional hardware components that are not depicted. Similarly, racks 200 may comprise fewer components than are depicted. Additionally or alternatively, one rack may be dedicated to a specific type of component while another rack is dedicated to a different type.

FIG. 3 depicts an example embodiment of hardware resources from multiple systems combined into logical pools. The disaggregated infrastructure may include multiple systems 300 comprising hardware components in communication over a compute fabric, such as compute fabric 216. In an embodiment, systems 300 may be substantially similar to racks 200, and in some embodiments may comprise blade enclosures. Individual systems 300 may comprise one or more blades 302, which include compute ("CPU") resources 304, memory ("MEM") resources 306, and storage resources 308.

CPU 304, MEM 306, and storage 308 may be combined and logically associated with compute pool 310, memory pool 312, and storage pool 314 (collectively, "resource pools"). In an embodiment, these resource pools may include all of the resources of the designated type within the disaggregated infrastructure. For example, compute pool 310 may include every compute resource 304 on every system 300 in the disaggregated infrastructure. Similarly, memory pool 312 may include every memory resource 306 on every system 300 in the disaggregated infrastructure. With reference back to FIG. 2, for example, each compute component 202 may belong to the same compute pool, and each memory resource 204 may be long to the same memory pool, regardless of which rack 200 those resources are located in. In other words, the disaggregated hardware components spread between multiple systems in the disaggregated infrastructure may be logically associated with a set of resource pools.

The resources may be pooled together based on any common attribute. For example, all the solid state drives may be grouped into a SSD pool, and all the spinning disk resources may be grouped into a spinning disk pool. Similarly, pools may have sub-pools. For example, the storage pool may have an SSD sub-pool and a spinning disk sub-pool. In an embodiment, pools and sub-pools may be managed using nested views, as discussed in detail below.

The disaggregated hardware components associated with the resource pools may be combined to form a new dynamically composed compute node. This compute node may comprise one or more dedicated hardware components that may be dynamically allocated to a given task. For example, a user may request resources to install an operating system comprising a specific software application. That user may be allocated dedicated compute, memory, network, and storage resources from the pools to operate the OS and application.

In some embodiments, resource allocation may be performed by a management utility or service. The management utility may have visibility into the systems and resource pools, and may be configured to receive requests from a user. In an embodiment, the management utility resides on a system outside of the disaggregated infrastructure, on a DCCN inside the disaggregated infrastructure, or some combination thereof. As discussed below, the management utility may perform many additional functions.

Figure 4:
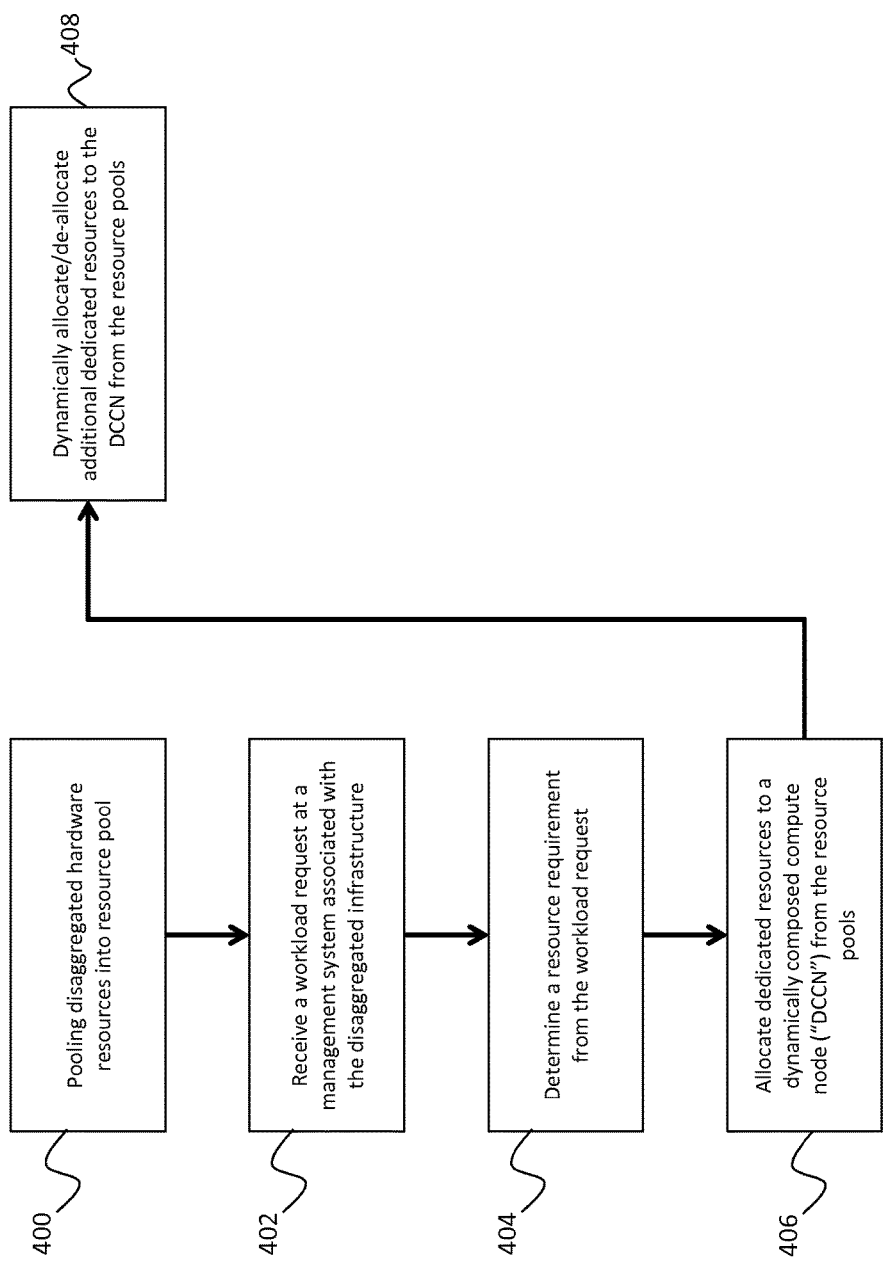
FIG. 4 depicts a process for creating a dynamically composed compute node consistent with an embodiment of the present disclosure.

FIG. 4 depicts a process for creating a dynamically composed compute node from disaggregated hardware components. At block 400, disaggregated hardware resources may be pooled together into a resource pool. This resource pool could be, for example, substantially similar to compute pool 310, memory pool 312, and/or storage pool 314. The resource pool may comprise all the resources of a given type in a disaggregated infrastructure. Additionally or alternatively, a given resource type may be divided between multiple pools. For example, storage resources may be divided between a primary storage pool and a secondary storage pool. The primary storage pool may contain resources reserved for specific users or processes, while the secondary resource pool may be a general-purpose pool.

At block 402, a workload request may be received at a management utility associated with the disaggregated infrastructure. The workload request may be any communication containing a request, instruction, or resource requirements for a dynamically composed compute node. For example, the workload request may be received from a user and may specify hardware requirements for a compute node. Additionally or alternatively, the workload request may include a request for software the user would like to install on a compute node. The management utility receiving the request may be substantially similar to the management utility discussed above. In an embodiment, the management utility has visibility into all of the resource pools in the system. The management utility may know which hardware components are being used and whom they are allocated to.

At block 404, a resource requirement is determined from the workload request. If the workload request included resource requirements, they may be extracted from the request. If the workload request included a request for software, the management utility may consult a catalog or other entity to determine minimum and/or optimal resource requirements for that software.

At block 406, resources may be allocated to a dynamically composed compute node from the resource pools. The compute node may include hardware components residing on one or more systems in the disaggregated infrastructure. For example, the resources may reside on two separate racks and communicate over a compute fabric, such as compute fabric 216. The allocated resources may be presented to the requester as a computer, and may include compute, memory, network, and storage resources. In an embodiment, the resources are dedicated to the requestor and not shared with any other tasks, users, or compute nodes. For example, a requestor may request four CPU cores, 1 TB of storage, and 10 GB of RAM. That requestor may be allocated the requested physical resources, and those resources may not be shared with anyone else.

At block 408, resources may be dynamically allocated or de-allocated from the DCCN. For example, the management utility may receive a second request for additional resources. Based on the second request, the management utility may allocate additional dedicated resources to the compute node. Similarly, resources may be de-allocated from the compute node and placed back into the resource pool. In some embodiments, the management utility may monitor the compute node's health and dynamically allocate or de-allocate resources as necessary. For example, additional storage resources may be dynamically added to a compute node that is approaching storage capacity. Similarly, if a compute node never consumes more than half its allocated memory, memory resources may be de-allocated.

The dynamically composed compute nodes discussed in reference to FIG. 2, FIG. 3, and FIG. 4 may provide numerous benefits over traditional infrastructures. These benefits may include data service availability, reduced latency, dynamic resource allocation and de-allocation, increased power efficiency and management, and improved monitoring capabilities. Each of these benefits is discussed in turn.

The dynamically composed compute nodes improve data service availability by distributing the services beyond the traditional siloed systems. Data services traditionally operate within a storage server or SAN, such as storage server 102, and are unavailable to a compute server, such as server 100. Applications operating at the compute server that store persistent data in local storage are therefore not privy to these services. The present dynamically composed compute nodes, in contrast, allows persistent data to be accessed directly through the compute fabric by any component in a manner that is consistent for all components. This allows data services to be applied to any data in the system, rather than just data stored on a storage server. For example, RAM pages may be written to persistent storage while an application is executed. Traditionally, these pages are not privy to data services because they are written to storage on the compute server. In a dynamically composed compute node, however, these pages may be written to storage that is accessible through the compute fabric, and may therefore benefit from data services that would otherwise only be available to persistent data on a storage server. The RAM pages could be, for example, deduplicated to conserve space.

The dynamically composed compute nodes also minimize latency with respect to both out-of-rack traffic and in-fabric communication. Out-of-rack traffic may be received and communicated directly to the compute fabric where it is routed to the appropriate components. Similarly, the disaggregated components within the system may communicate directly with each other over the compute fabric. This reduces the number of hops, intermediaries, and protocols involved in the communication, thereby improving efficiency.

Extending the power system across all of the disaggregated hardware components may enhance power efficiency and management. Different components may be allocated more or less power based on the workload they are executing. Components that are not being used may not receive any power until they are allocated to a DCCN. In an embodiment, power requirements may be specified in the workload request similar to other resource requirements. Additionally or alternatively, they may be dynamically determined based on the software and/or components specified in the workload request.

The disaggregated hardware components may be monitored from the management utility using in-band and/or out-of-band monitoring. This monitoring allows the management utility to provide point-in-time information about the components and their utilization. Based on this information, components may be reallocated to different compute nodes to improve performance and efficiency. For example, the management utility may use the monitoring information to identify available resources for a given workload request, or identify an optimal resource for an existing DCCN. The utility may then allocate those resources to the DCCN.

An embodiment of the present disclosure comprises in-band monitoring on the compute fabric. The management utility may be in communication with fabric busses that are used by a given DCCN during operation. The utility may monitor the buses to gather information about the performance and utilization of the constituent components. Similarly, the management utility may issue configuration commands, such as instructions to allocate specific resources, over the compute fabric. In an embodiment, the management utility passively monitors the busses for information. Additionally or alternatively, the management utility may poll the hardware components or resource pools to retrieve the desired information.

In some embodiments, in-band monitoring allows the management utility to discover newly added hardware components. These components may broadcast their presence when they are connected to the fabric, and/or the management utility may periodically poll all of the components connected to the fabric to identify new resources.

Additionally or alternatively, an embodiment of the present disclosure may comprise out-of-band monitoring. Individual components in the disaggregated infrastructure may include a management port for locally gathering statistics and sending them out-of-band to the management utility. Similarly, configuration information and/or instructions may be transmitted to the management port rather than over the fabric busses. Configuration modifications may be sent to the management port using telnet, ssh, or the like. Out-of-band monitoring may be beneficial if component operations are saturating the fabric, or if the fabric is otherwise unavailable.

Some embodiments may include both in-band and out-of-band monitoring. In-band monitoring may be used when the compute fabric is available or unsaturated. Out-of-band monitoring may be used as a backup, and the management utility may dynamically switch between the two based on fabric saturation, availability, or the like.

The monitoring capabilities may also provide nested views of different elements, components, and information within the disaggregated infrastructure. The systems and components in the disaggregated infrastructure may be divided into layers for greater transparency and control. For example, a bottom layer may contain information about specific hardware resources on a given blade in a box. A next layer may describe the current status or inventory of the box, such as which blades or line cards are in the box, and may embody the information contained in the bottom layer. A top layer may describe the inventory and status of all the boxes in a disaggregated infrastructure, and may include information from both the mid and the bottom layers. In this manner, different views may be nested within each other to provide varying levels of granularity. A user or management utility may desire information about the general health of the disaggregated infrastructure, and therefore only extract information from the topmost layer. Additionally or alternatively, the user or management utility may desire information about components operating on a given blade in a specific box, and may drill down through the nested views to acquire the desired information.

Views may be based on any type of quantifiable information about components or sub-components within the disaggregated infrastructure. For example, one view may be a line card utilization view. Another may be based on connection speeds, feeds, or other port information for individual blades in a box. This port information may then be aggregated together on a per-box basis to provide a second level view, and then summarized at a top level to provide an overview for the entire disaggregated infrastructure. Other information used to create one or more views may include forwarding constructs for the compute fabric, connected nodes and node topology constraints, aggregate traffic throughput, routing and forwarding information, L1/L2 cache sizes, clock frequency, available dram memory, etc.

Although the examples above discuss three layers nested within each other, any number of views and layers is consistent with the present disclosure. Similarly, parent views may add new information that is not encapsulated by the child views. These views may also be used to dynamically allocate resources to different virtual computers, as discussed in detail below.

Figure 5:
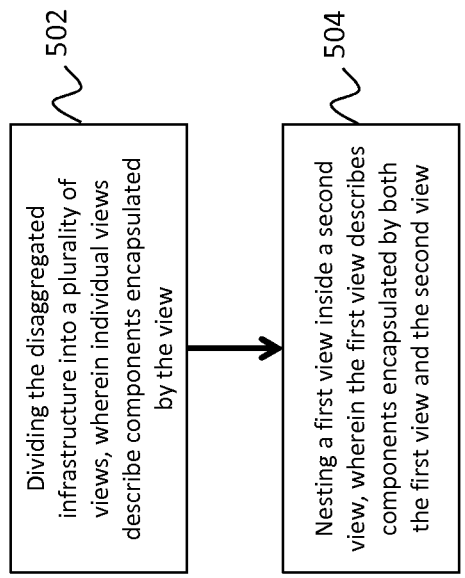
FIG. 5 depicts a flowchart for nesting views consistent with an embodiment of the present disclosure.

FIG. 5 depicts a general process for creating nested views in a disaggregated infrastructure.

At block 502, a disaggregated infrastructure may be divided into a plurality of views, wherein the individual views describe components encapsulated by that view. For example, the disaggregated infrastructure may be substantially similar to the one shown in FIG. 2. Three views could be created for each rack 200. A first view may describe the utilization of individual compute resources, a second view may summarize available/consumed space on individual storage resources, and a third view may summarize available/consumed memory on available memory resources. In this manner, each view includes information describing the components encapsulated by that view.

At block 504, a first view may be nested inside a second view, where the second view describes components encapsulated by both the first view and the second view. For example, a rack view may be created for each rack discussed in reference to block 502. The compute view, memory view, and storage view for each rack may be nested inside the rack view. OOR network connectivity information may also be included in the rack view. These rack views, in turn, may be nested inside a top level disaggregated infrastructure view. This disaggregated infrastructure view may therefore comprise information about the racks (from the rack view) and the individual components within the racks (from the compute view, memory view, and storage view). Additionally, new views may be created from the nested views. For example, a global compute view, global memory view, and global storage view may be created which describe all of the compute, memory, and storage resources in the system. This may be particularly helpful when allocating the disaggregated components to dynamically composed compute views because the management utility may quickly identify optimal resources.

Figure 6:
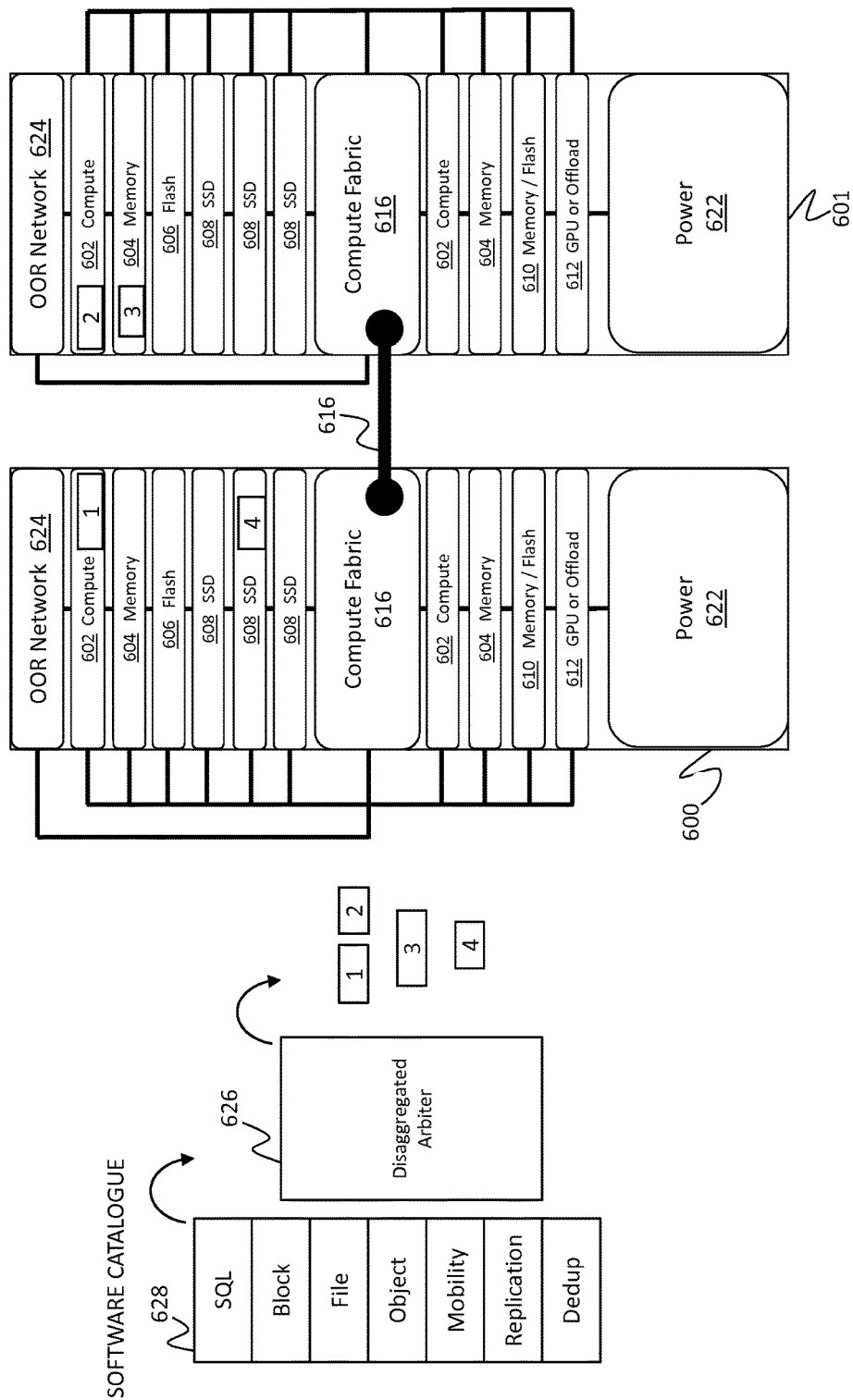
FIG. 6 depicts an architecture of installing software on disaggregates hardware components consistent with an embodiment of the present disclosure.

Turning now to FIG. 6, a system and process for overlaying application functionality on disaggregated components grouped into a dynamically composed compute node is discussed. FIG. 6 may include racks 600 and 601, which may be substantially similar to racks 200 discussed above. These racks may include disaggregated hardware components, such as compute 602, memory 604, flash 606, solid state drive 608, flash memory 610, and GPU 612. Each of the components may be in communication with compute fabric 616, thereby connecting the components both within and between racks. The communication with compute fabric 616 may be facilitated via physical interfaces, as discussed in reference to FIG. 2. Compute fabric 616 may also be in communication with out of rack network 624.

FIG. 6 also includes disaggregated arbiter 626 and software catalog 628. Disaggregated arbiter 626 may be a software application used to overly or install software applications on disaggregated hardware components that have been grouped into a DCCN. In an embodiment, disaggregated arbiter 626 is the management utility discussed above. Additionally or alternatively, disaggregated arbiter 626 may be a separate software entity that operates independently of the management utility.

Software catalog 628 may comprise various software offerings that may be installed on a dynamically composed compute node. The catalog may include operating systems, applications, hypervisors, or any other type of software application. For example, the software catalog may include multiple storage software offerings, such as SQL, block, file, or object based storage solutions, or data mobility, replication, or deduplication services. In some embodiments, disaggregated arbiter 626 may add and/or remove software to catalog 628.

In some embodiments, the disaggregated arbiter may receive a workload request identifying software to install on disaggregated hardware components. This software may be chosen from software catalog 628, and disaggregated arbiter 626 may identify compute resource requirements 1 and 2, memory resource requirement 3, and storage resource requirement 4. Available resources meeting these requirements may be identified in rack 600 or rack 601, and the software may be installed. Once installed, disaggregated arbiter 626 may start the applications or boot the operating systems, and expose them for use. This process is discussed in detail with reference to FIG. 7 through FIG. 10.

Figure 7:
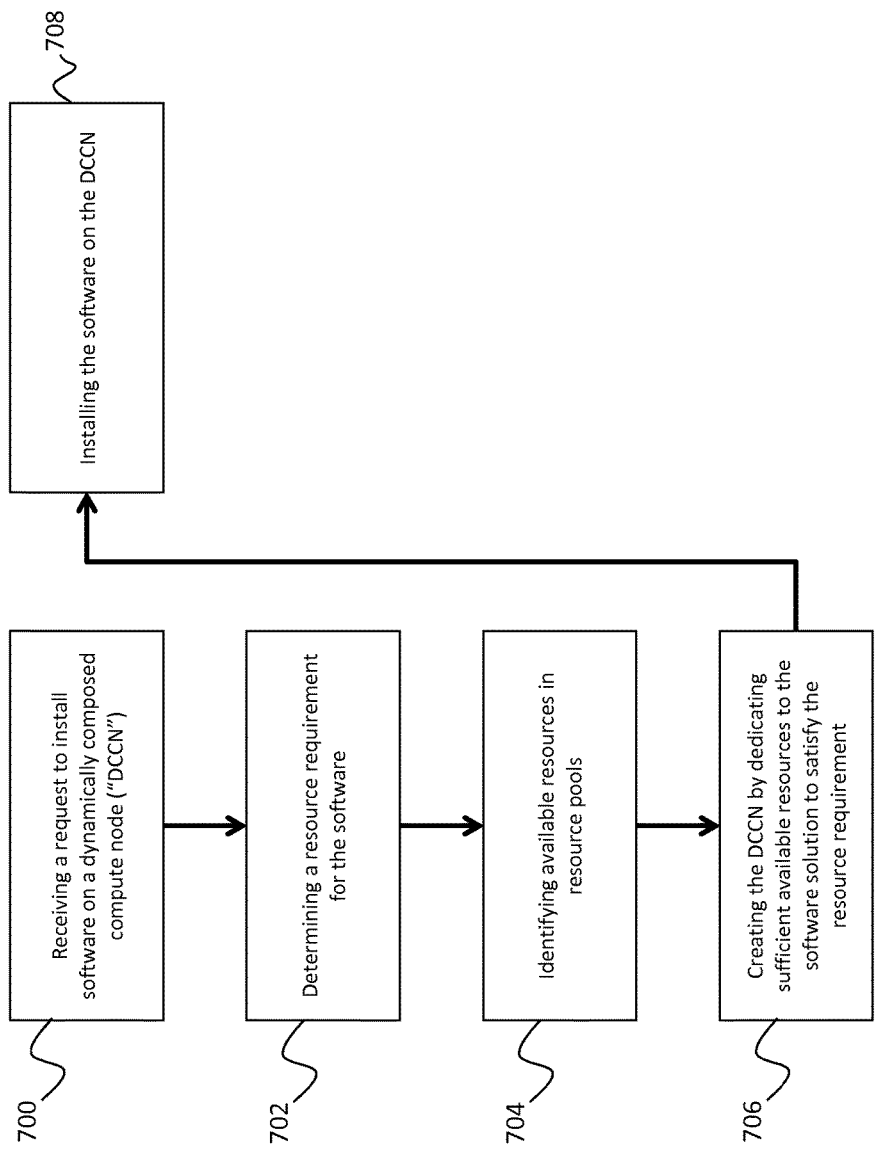
FIG. 7 depicts a process for installing software on disaggregated components consistent with an embodiment of the present disclosure.

Turning now to FIG. 7, a process for installing a software application on a compute node comprising disaggregated hardware components is discussed. At block 700, a request to install software on a DCCN may be received. In an embodiment, the request is similar to the workload request discussed above. The request may be received at the disaggregated arbiter, the management utility, and/or both.

At block 702, resource requirements for the software may be determined. These resource requirements could come from a software catalog, such as software catalog 628. Additionally or alternatively, they may be included in the request itself. In some embodiments, both minimum and optimal requirements may be identified. The disaggregated arbiter may then decide whether to use the minimum requirements, optimal requirements, or something in-between. This decision could be based, for example, on user or policy. These resource requirements may be, for example, compute requirements 1 and 2, memory requirement 3, and/or storage requirement 4.

At block 704, available resources may be identified from resource pools. These resource pools may be substantially similar to those discussed above. In an embodiment, optimal resources may be identified from the resource pools. For example, if a software application requires 1 GB of memory, the memory resource pool may be queried to identify a memory resource that has a contiguous 1 GB chunk of memory. In some embodiments, this contiguous memory may be identified using the nested views discussed above.

At 706, a dynamically composed compute node may be created by dedicating sufficient resources to the compute node to satisfy the software instance's resource requirement. These resources may comprise any hardware component connected to the compute fabric, and may be on the same or different racks. For example, in FIG. 6 the compute node may be created by allocating memory from rack 601 for memory requirement 3, and storage from rack 600 for storage requirement 4. Compute resources may be allocated from both rack 600 and rack 601 for compute requirements 1 and 2. This allows the dynamically composed compute node to be created from any available hardware components in the disaggregated infrastructure.

At block 708, the software may be installed on the allocated resources in the DCCN. In other words, the software may be installed on the compute node created from the pooled resources. Once the software has been installed, the complete DCCN with overlaid application functionality may be presented to the requestor.

Figure 8:
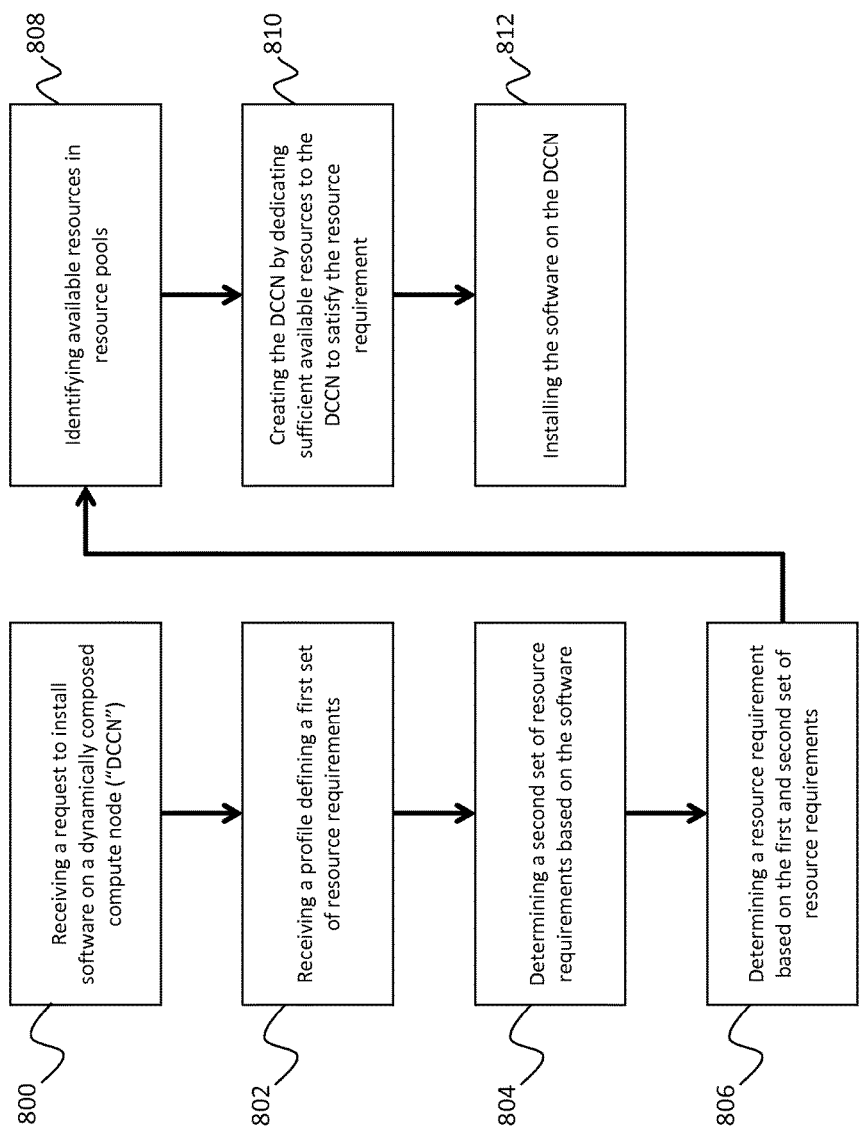
FIG. 8 depicts a process for determining resource requirements consistent with an embodiment of the present disclosure.

FIG. 8 depicts a process for determining resources to allocate to a dynamically composed compute node. At block 800, a request to install software on a dynamically composed compute node may be received. This may be substantially similar to block 700 discussed above.

At 802, a profile defining a first set of resources may be received. This profile could be, for example, included in the request. In some embodiments the profile may include special resource requirements not otherwise considered by the disaggregated arbiter. For example, the profile may specify that all allocated memory must be in a contiguous block. Additionally or alternatively, the profile may specify minimum and/or maximum resource requirements to be applied, regardless of the software to be installed on the DCCN. The disaggregated arbiter may always accommodate the requirements defined in the profile, used best efforts to accommodate the requirements, or ignore the requirements.

At block 804, a second set of requirements may be determined based on the software. For example, the minimum and/or optimal requirements required for the software to run may be identified.

At block 806, the first set of resource requirements and the second set of resource requirements may be combined to determine the final resource requirements. For example, the received profile may specify that all memory must be contiguous and the requirements derived from the software may specify at least 2 GB of memory are required. The combined, final resource requirement would therefore be 2 GB of contiguous memory.

At block 808, available resources satisfying the requirements may be identified from the resource pools. If there are no available resources that satisfy the requirements, the disaggregated arbiter may raise an alert, use best efforts, or take other remedial actions.

At block 810, the identified resources may be used to create the dynamically composed compute node, and at block 812 the software may be installed on the compute node.

Figure 9:
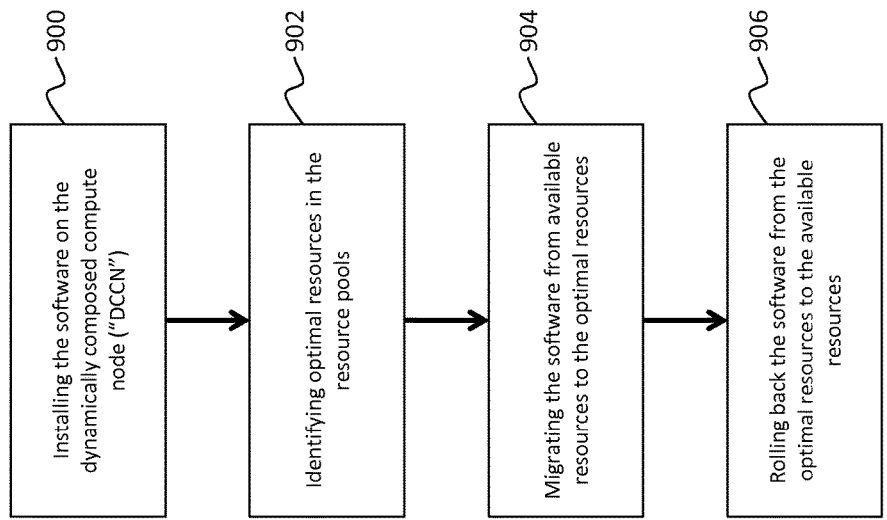
FIG. 9 depicts a process for migrating software consistent with an embodiment of the present disclosure.

Turning now to FIG. 9, a process for migrating software between resources and rolling back changes is discussed. At block 900, software may be installed on a dynamically composed compute node using any of the methods discussed herein.

At 902, optimal resources in the disaggregated infrastructure may be identified. For example, when the software was first installed it may have been allocated memory on different memory components spread throughout the disaggregated infrastructure. At block 902, a contiguous block of memory may be identified. This memory may not have been available at the time the DCCN was created, and/or may have been recently added to the disaggregated infrastructure. In some embodiments, optimal resources may be identified as the result of a hardware failure. For example, if one of the originally allocated hardware components fails, a new, optimal resource may be identified.

At block 904, the software may be migrated to the newly identified optimal resources. This could be accomplished, for example, by allocating the new resources to the DCCN and then de-allocating the old resources. The disaggregated arbiter, the management utility, or both may manage this migration process.

Finally, at block 906 the software may be rolled back from the optimal resource to the original resources. This could occur, for example, if there was an error in the migration operation or if one of the new hardware components fails. In some embodiments, new optimal resources may be identified and the software may be migrated to those new optimal resources rather than rolling back to the original hardware.

Figure 10:
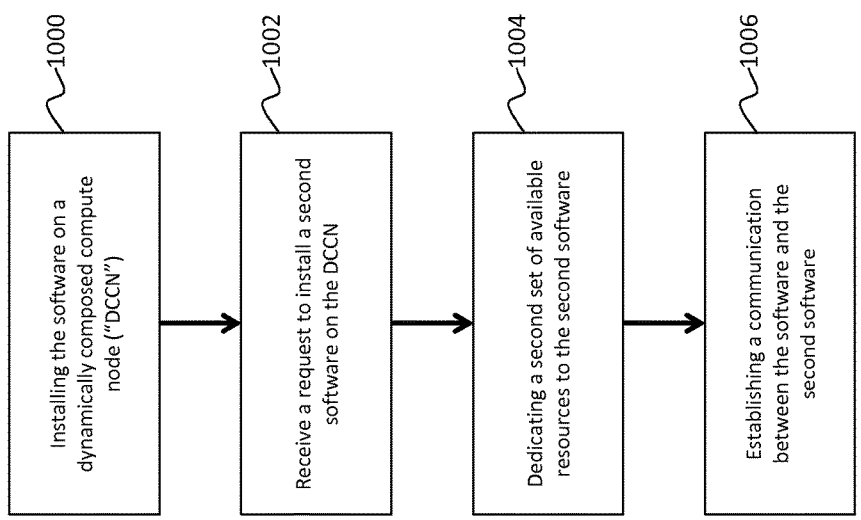
FIG. 10 depicts a process for establishing communication between two software solutions consistent with an embodiment of the present disclosure.

With reference to FIG. 10, a flowchart depicting a process for connecting multiple software instances is discussed. These instances may be connected together to form, for example, a virtual datacenter. Similarly, the software instances may be designed to interact with one another, such as an application server, web server, and database.

At block 1000, a first software instance may be installed on a dynamically composed compute node. This first software instance may be installed using any of the methods discussed herein.

At block 1002, a request may be received to install a second software instance. This second software may be designed to communicate and provide functionality in combination with the first software instance. For example, the first software instance may be a webserver and the second software instance may be an application server.

At block 1004, a second set of resource may be dedicated to the second software instance. These resources may be identified, allocated, and/or dedicated in any manner discussed in the present application.

Finally, at block 1006, a communication may be established between the two software instances. This communication may be established, for example, over the compute fabric or a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for managing resources in a disaggregated infrastructure, the method comprising:

pooling disaggregated hardware resources across multiple enclosures into resource pools, the resource pools comprising a compute resource pool, a memory resource pool, and a storage resource pool, wherein each of the multiple enclosures includes a compute resource in the compute pool, a memory resource in the memory pool, and a storage resource in the storage pool, wherein the disaggregated hardware resources are in communication with a compute fabric, wherein the disaggregated hardware resources communicate directly with each other using the compute fabric when they are in different enclosures within the multiple enclosures, wherein a first subset of the resource pools are reserved for specific users or processes and a second subset of the resource pools comprise general purpose resource pools;

receiving a first workload request at a management system associated with the disaggregated infrastructure;

determining by the management system a first resource requirement from the first workload request, wherein the first resource requirement comprises a power requirement;

allocating dedicated resources to a dynamically composed computed node ("DCCN") from the resource pools, wherein the allocation is based on the first resource requirement;

receiving a second workload request at the management system associated with the disaggregated infrastructure;

determining a second resource requirement from the second workload request, wherein the second resource requirement comprises a power requirement;

allocating or de-allocating dedicated resources to or from the DCCN from or to the resource pools, wherein the allocating or deallocating is based on the second resource requirement; and dynamically allocating or deallocating dedicated resources for the DCCN from or to the resource pools based on the management system monitoring the DCCN, wherein the management system has visibility into the resource pools allowing the management system to provide information about the disaggregated hardware resources and their utilization, wherein the management utility may dynamically switch between in-band monitoring and/or out-of-band monitoring.

2. The method of claim 1, wherein the disaggregated infrastructure comprises a plurality of hardware racks comprising hardware components, wherein the hardware components are in communication with each other through the compute fabric.

3. The method of claim 1, wherein the compute resource pool comprises compute resources, the memory resource pool comprises memory resources, and the storage resource pool comprises storage resources.

4. The method of claim 1, further comprising dividing the disaggregated infrastructure into a plurality of views, wherein individual views describe components encapsulated by the view.

5. The method of claim 4, further comprising nesting a first view inside a second view, wherein the first view describes components encapsulated by both the first view and the second view.

6. A computer program product for managing resources in a disaggregated infrastructure, the computer program product comprising a non-transitory computer readable medium encoded with computer executable program, the code enabling:
    pooling disaggregated hardware resources across multiple enclosures into resource pools, the resource pools comprising a compute resource pool, a memory resource pool, and a storage resource pool, wherein each of the multiple enclosures includes a compute resource in the compute pool, a memory resource in the memory pool, and a storage resource in the storage pool, wherein the disaggregated hardware resources are in communication with a compute fabric, wherein the disaggregated hardware resources communicate directly with each other using the compute fabric when they are in different enclosures within the multiple enclosures, wherein a first subset of the resource pools are reserved for specific users or processes and a second subset of the resource pools comprise general purpose resource pools;
    receiving a first workload request at a management system associated with the disaggregated infrastructure;
    determining a first resource requirement from the first workload request, wherein the first resource requirement comprises a power requirement;
    allocating dedicated resources to a dynamically composed computed node ("DCCN") from the resource pools, wherein the allocation is based on the first resource requirement;
    receiving a second workload request at the management system associated with the disaggregated infrastructure;
    determining a second resource requirement from the second workload request, wherein the second resource requirement comprises a power requirement;
    allocating or de-allocating dedicated resources to or from the DCCN from or to the resource pools, wherein the allocating or deallocating is based on the second resource requirement; and
    dynamically allocating or deallocating dedicated resources for the DCCN from or to the resource pools based on the management system monitoring the DCCN, wherein the management system has visibility into the resource pools allowing the management system to provide information about the disaggregated hardware resources and their utilization, wherein the management utility may dynamically switch between in-band monitoring and/or out-of-band monitoring.

7. The computer program product of claim 6, wherein the disaggregated infrastructure comprises a plurality of hardware racks comprising hardware components, wherein the hardware components in the racks are in communication with each other through the compute fabric.

8. The computer program product of claim 6, further comprising dividing the disaggregated infrastructure into a plurality of views, wherein individual views describe components encapsulated by the view.

9. The computer program product of claim 8, further comprising nesting a first view inside a second view, wherein the first view describes components encapsulated by both the first view and the second view.

10. A system for managing resources in a disaggregated infrastructure, the computer system comprising a computer processor configured to execute instructions comprising:
    pooling disaggregated hardware resources across multiple enclosures into resource pools, the resource pools comprising a compute resource pool, a memory resource pool, and a storage resource pool, wherein each of the multiple enclosures includes a compute resource in the compute pool, a memory resource in the memory pool, and a storage resource in the storage pool, wherein the disaggregated hardware resources are in communication with a compute fabric, wherein the disaggregated hardware resources communicate directly with each other using the compute fabric when they are in different enclosures within the multiple enclosures, wherein a first subset of the resource pools are reserved for specific users or processes and a second subset of the resource pools comprise general purpose resource pools;
    receiving a first workload request at a management system associated with the disaggregated infrastructure;
    determining a first resource requirement from the first workload request, wherein the first resource requirement comprises a power requirement;
    allocating dedicated resources to a dynamically composed computed node ("DCCN") from the resource pools, wherein the allocation is based on the first resource requirement;
    receiving a second workload request at the management system associated with the disaggregated infrastructure;
    determining a second resource requirement from the second workload request, wherein the second resource requirement comprises a power requirement;
    allocating or de-allocating dedicated resources to or from the DCCN from or to the resource pools, wherein the allocating or deallocating is based on the second resource requirement; and
    dynamically allocating or deallocating dedicated resources for the DCCN from or to the resource pools based on the management system monitoring the DCCN, wherein the management system has visibility into the resource pools allowing the management system to provide information about the disaggregated hardware resources and their utilization, wherein the management utility may dynamically switch between in-band monitoring and/or out-of-band monitoring.

11. The system of claim 10, wherein the disaggregated infrastructure comprises a plurality of hardware racks comprising hardware components, wherein the hardware components in the racks are in communication with each other through the compute fabric.

12. The system of claim 10, further comprising dividing the disaggregated infrastructure into a plurality of views, wherein individual views describe components encapsulated by the view.

* * * * *